United States Patent
Lawrence et al.

(10) Patent No.: US 6,194,358 B1
(45) Date of Patent: Feb. 27, 2001

(54) HOPPER CAR ANTI-BRIDGING METHOD AND COATING

(75) Inventors: James A. Lawrence, Hickory Hills, IL (US); Terrence A. Bell, Pittsburgh, PA (US)

(73) Assignee: Superior Graphite Co., Chicago, IL (US)

( * ) Notice: Subject to any disclaimer, the term of this patent is extended or adjusted under 35 U.S.C. 154(b) by 0 days.

(21) Appl. No.: 09/207,825

(22) Filed: Dec. 9, 1998

Related U.S. Application Data

(60) Provisional application No. 60/107,369, filed on Nov. 6, 1998, now abandoned.

(51) Int. Cl.[7] .................. C10M 125/02; C10M 129/00; C10M 145/00; C10M 105/44
(52) U.S. Cl. ..................... 508/115; 508/113; 508/122; 427/384; 427/385.5
(58) Field of Search ..................... 508/113, 115, 508/122; 427/384, 385.5

(56) References Cited

U.S. PATENT DOCUMENTS

| | | | | |
|---|---|---|---|---|
| 4,338,359 | * | 7/1982 | Kestner | 427/230 |
| 5,282,887 | * | 2/1994 | Gay et al. | 106/261 |

* cited by examiner

*Primary Examiner*—Margaret Medley
*Assistant Examiner*—Cephia D. Toomer
(74) *Attorney, Agent, or Firm*—Cook, Alex, McFarron, Manzo, Cummings & Mehler, Ltd.

(57) ABSTRACT

A method of treating hopper cars to prevent bridging or sticking of bulk commodities during unloading by applying a coating of a mixture comprising pigments including graphite, solvents, resins, a drier/cross-linking/hardening system, and a rheological system. The resin is selected from the group consisting of alkyds, acrylics, polyesters, hydrocarbon resins, rosin-based resins, polyamides, urethanes, and epoxies. The solvent comprises aliphatic and aromatic hydrocarbons. Ranges in weight-percent for each of the components is set forth, as well as a specific formulation.

8 Claims, No Drawings

HOPPER CAR ANTI-BRIDGING METHOD AND COATING

CROSS REFERENCE TO RELATED APPLICATION

This application claims the benefit of provisional application Ser. No. 60/107,369 filed Nov. 6, 1998, now abandoned.

This application relates to a method of treating hopper cars to prevent bridging or sticking of bulk commodities during unloading and a coating to be applied to the hopper cars in connection with the method.

BACKGROUND OF INVENTION

Bulk products such as stone, coal, and grain, are often shipped in hopper cars that have sloping floors to allow the commodity to be discharged through hinged doors in the bottom of the car. There has been a constant problem with the incomplete unloading of such hopper cars due to friction between the commodity in the container surface and/or cohesion between the commodity and the container surface, the latter often being caused by freezing. This incomplete unloading is a particular problem in the coal industry. Coal carry back—coal retained in the hopper cars after unloading—presents a two-pronged productivity challenge because it results in both an increase in the number of hopper cars needed to deliver a given-amount of coal and an increase in the fuel costs for the "dead head" return trip of the "empty" hopper car to the source of the coal. Further, various manual methods used to assist the discharge of coal through the hopper increase the time required for unloading the car.

Various attempts have been made to provide hopper cars with coating to facilitate the unloading. For example, U.S. Pat. No. 4,425,381 to Walsh discloses applying a coating to the inside of the hopper car comprising a dispersion of waxy, short-chain telomers in a dispersing solvent. The coating is applied by spraying the inside of the hopper car shortly before or continuously during loading, with the container wall and the cargo itself receiving a thin film of the release agent. This film is worn away and needs to be reapplied each time the container is reloaded.

U.S. Pat. No. 4,410,599 to Roe et al. discloses a freeze-adherence suppression agent to prevent bulk cargo from freezing to the sides of the container. The release agent is formulated by adding polymeric ethylene oxide to a brine. This was found to reduce the freeze adherence of cargos having appreciable quantities of unwanted moisture. The release agent forms a gel at temperatures less than 65° F. on the surfaces of the bin. The gel converts to a sol or colloidal fluid at temperatures above 70–80° F. which can be readily hosed off the walls of the container. This release agent would also need to be reapplied frequently to the surfaces of the hopper or bin.

Accordingly, it is an object of the present invention to provide a method for treating the interior of hopper cars with a coating that helps to insure a more complete discharge of the commodity stored within the hopper.

It is a related object to provide the coating for performing the method.

It is still a further object to provide both a method and a coating that results in a durable, long lasting coating.

These objects, as well as others, are provided by a method of treating the interior of a hopper car including the application of a coating of a mixture comprising pigments including graphite, solvents, resins, a carboxylate-based drier system, and a rheological system.

DESCRIPTION OF THE PREFERRED EMBODIMENT

The coating according to the present invention is exemplified by the following example, showing ranges for the various components expressed as a percent of the total weight.

| Component | Low (wt %) | High (wt %) |
|---|---|---|
| Resins | 15 | 25 |
| Solvents/Diluents | 40 | 50 |
| Rheological Additive | 2 | 4 |
| Carboxylate-based and/or other drier/cross-linking/hardening systems | 0.5 | 1.5 |
| Pigments including Graphite | 30 | 40 |

The resins may be selected from the group of one or more of alkyds, hydrocarbon resins, polyesters, acrylics, urethanes, rosin-based resins, polyamides, and epoxies, while the solvents may be selected from the family of aliphatic and aromatic hydrocarbons. The pigment may be supplied as natural or synthetic graphite suspended in resins and solvents and available as SLIP PLATE STS dry film lubricant from the Superior Graphite Co. of Chicago, Ill.

A specific example of the coating, as to be applied to a primed surface, is as follows:

| Component | Wt % |
|---|---|
| Alkyd Resin | 14 |
| Rosin Ester Resin | 3 |
| Aliphatic Hydrocarbon Solvent | 44 |
| Aromatic Hydrocarbon Solvent | 1 |
| Organophilic Clay | 1.5 |
| Methyl Alcohol/water | 0.7 |
| Carboxylate Driers | 0.5 |
| Surface Dry Inhibitor | 0.3 |
| Natural Graphite Pigment | 34 |
| Anti-Corrosive Pigment | 1 |

The surface to which the coating is to be applied should be thoroughly cleaned of all dirt, oil and build-up, as is typical for any painting procedure. Abrasive blasting and the application of a primer to the surface may be necessary, with the primer being allowed to dry thoroughly before application of the coating. The coating then should be mixed well so as to be of a uniform consistency, and then applied wet to the side walls, end walls, slope sheets, door components and flow separator of the hopper car.

The use of a coating according to the present invention has been found to reduce the unloading time for coal cars by almost one-third, with no manual assistance required. Further, the coating has proven to be durable and can be applied with no structural modification of the hopper car.

Thus, it can be seen that a coal car coating has been provided that meets the above-identified objects. While the invention has been disclosed in terms of specific examples, these examples are primarily illustrative, and various changes will occur to those skilled in the art. For example, while the invention has been described in the context of a railroad coal hopper car, it is equally applicable to any container for bulk materials using a gravity feed.

What is claimed is:

1. A lubricating coating comprising:
   14 wt % alkyd resin;
   3 wt % rosin ester resin;
   44 wt % aliphatic hydrocarbon solvent;
   1 wt % aromatic hydrocarbon solvent;
   1.5 wt % organophilic clay;
   0.7 wt % methyl alcohol/water;
   0.5 wt % carboxylate driers;
   0.3 wt % surface dry inhibitor;
   34 wt % natural graphite pigment; and
   1 wt % anti-corrosive pigment.

2. A method of facilitating the discharge of bulk materials from a container comprising applying a coating of a mixture comprising:
   14 wt % alkyd resin;
   3 wt % rosin ester resin;
   44 wt % aliphatic hydrocarbon solvent;
   1 wt % aromatic hydrocarbon solvent;
   1.5 wt % organophilic clay;
   0.7 wt % methyl alcohol/water;
   0.5 wt % carboxylate driers;
   0.3 wt % surface dry inhibitor;
   34 wt % natural graphite pigment; and
   1 wt % anti-corrosive pigment.

3. A method of facilitating the discharge of bulk materials from a container comprising applying a coating of a mixture comprising graphite, solvent, and resin.

4. The method of claim 1 wherein the resin is selected from the group consisting of alkyds, acrylics, polyesters, hydrocarbon resins, rosin-based resins, polyamides, urethanes, and epoxies.

5. The method of claim 1 wherein the solvent comprises aliphatic and aromatic hydrocarbons.

6. A method of facilitating the discharge of bulk materials from a container comprising applying a coating of a mixture comprising:
   30 to 40 wt % of a pigment mixture comprising natural or synthetic graphite;
   40 to 50 wt % consisting of one or more of a solvent and diluent; and
   15 to 25 wt % of a resin consisting of one or more of a synthetic resin, a hydrocarbon resin, and a natural resin.

7. A method of facilitating the discharge of bulk materials from a container comprising applying a coating of a mixture comprising graphite, solvent, resin, a carboxylate-based drier, and an organophilic clay.

8. A method of facilitating the discharge of bulk materials from a container comprising applying a coating of a mixture comprising:
   30 to 40 wt % of a pigment mixture comprising natural or synthetic graphite;
   40 to 50 wt % consisting of one or more of a solvent and diluent;
   15 to 25 wt % of a resin consisting of one or more of a synthetic resin, a hydrocarbon resin, and a natural resin;
   0.5 to 1.5 wt % of a carboxylate-based drier system; and
   2 to 4 wt % of an organophilic clay.

\* \* \* \* \*